United States Patent
Clarke et al.

(10) Patent No.: US 7,560,189 B2
(45) Date of Patent: *Jul. 14, 2009

(54) MIXED ELECTROLYTE BATTERY

(75) Inventors: Robert Lewis Clarke, Orinda, CA (US); Brian Dougherty, Menlo Park, CA (US); Stephen Harrison, Benicia, CA (US); J. Peter Millington, Weaverham (GB); Samaresh Mohanta, Fremont, CA (US)

(73) Assignee: Plurion Limited (GB)

( * ) Notice: Subject to any disclaimer, the term of this patent is extended or adjusted under 35 U.S.C. 154(b) by 433 days.

This patent is subject to a terminal disclaimer.

(21) Appl. No.: 10/483,942

(22) PCT Filed: Feb. 12, 2002

(86) PCT No.: PCT/US02/04740

§ 371 (c)(1),
(2), (4) Date: May 24, 2004

(87) PCT Pub. No.: WO03/017397

PCT Pub. Date: Feb. 27, 2003

(65) Prior Publication Data

US 2005/0118498 A1  Jun. 2, 2005

(30) Foreign Application Priority Data

Aug. 10, 2001 (WO) .................... PCT/US01/41678

(51) Int. Cl.
*H01M 4/58* (2006.01)
*H01M 4/42* (2006.01)
*H01M 6/04* (2006.01)

(52) U.S. Cl. .............. 429/105; 429/204; 429/229; 429/231.5

(58) Field of Classification Search ............ 429/105, 429/204, 229, 231.5
See application file for complete search history.

(56) References Cited

U.S. PATENT DOCUMENTS

| | | | |
|---|---|---|---|
| 4,362,791 A * | 12/1982 | Kaneko et al. ............. 429/101 |
| 4,784,924 A | 11/1988 | Savinell et al. |
| 4,814,241 A | 3/1989 | Nagashima et al. |
| 5,061,578 A | 10/1991 | Kozuma et al. |
| 5,318,865 A | 6/1994 | Kaneko et al. |
| 5,366,824 A | 11/1994 | Nozaki et al. |
| 5,610,802 A | 3/1997 | Eidler et al. |
| 5,851,694 A | 12/1998 | Miyabashi et al. |
| 6,468,688 B2 | 10/2002 | Kazacos et al. |

(Continued)

OTHER PUBLICATIONS

Iwasa, et al., Fundamental Studies on the Electrolyte Solutions of Novel Redox Flow Battery for Electricity Storage, 2001.

(Continued)

*Primary Examiner*—Tracy Dove
(74) *Attorney, Agent, or Firm*—Fish & Associates, PC

(57) ABSTRACT

A battery (100B) comprises an electrolyte in which a first element forms a redox pair with a second element, wherein the battery (100B) is charged at a voltage sufficient to plate the first element at the anode (122B) and wherein the voltage is insufficient to plate the second element on the anode (122B). Preferred batteries include secondary batteries comprising a mixed electrolyte that includes a redox pair formed by a first element and a second element.

20 Claims, 1 Drawing Sheet

U.S. PATENT DOCUMENTS

| | | |
|---|---|---|
| 6,475,661 B1 | 11/2002 | Pellegri et al. |
| 6,613,298 B2 | 9/2003 | Tanaka |
| 6,652,819 B2 | 11/2003 | Shiroto |
| 6,692,862 B1 | 2/2004 | Zocchi |
| 6,986,966 B2 * | 1/2006 | Clarke et al. ............... 429/210 |

OTHER PUBLICATIONS

Fang, et al., A Study of the Ce(III)/Ce(IV) Redox Couple For Redox Flow Battery Application, Apr. 8, 2002.

* cited by examiner

MIXED ELECTROLYTE BATTERY

FIELD OF THE INVENTION

The field of the invention is batteries and battery electrolytes.

BACKGROUND OF THE INVENTION

Many types of batteries and other power cells are known, based upon a relatively wide range of electrical couples, and among the most popular electrical couples are those containing zinc.

For example, zinc is frequently employed in primary batteries. Such batteries are typically found in many simple flashlight batteries to provide a relatively inexpensive and reliable power source. Although manufacture of Zn/C batteries is typically simple and poses only relatively little environmental impact, various disadvantages of Zn/C batteries exist. Among other things, the ratio of power to weight in commonly used Zn/C batteries is relatively poor.

To improve the power to weight ratio, alternative coupling partners for zinc may be utilized. Among other metal oxides, mercury oxide or silver oxide have been employed to manufacture primary batteries with significantly improved power to weight ratio. However, the toxicity of mercury oxide is frequently problematic in manufacture, and tends to become even more problematic when such batteries are discarded. On the other hand, silver oxide as a coupling partner for zinc is environmentally substantially neutral. However, silver oxide is in many instances economically prohibitive, especially where such batteries are used in everyday devices (e.g., portable CD player or radio).

Alternatively, zinc air battery systems may be employed in applications where a favorable ratio of weight to capacity is particularly important. In such zinc air batteries, atmospheric oxygen is used as a gaseous coupling partner for zinc, which is typically provided in form of gelled zinc powder anodes. Among the various advantages in such batteries, using air (i.e., oxygen) as coupling partner for zinc significantly reduces weight. However, reasonable shelf life of such batteries can often only be achieved by using an airtight seal. Furthermore, to provide continuous operation, air must have an unobstructed path through the battery to the cathode so that the oxygen in the air is available to discharge the cathode. Moreover, commercial applications of zinc-air batteries have previously been limited to primary or non-rechargeable types.

Thus, while zinc may be combined with various redox partner to provide at least a somewhat advantageous power to weight ratio, many of those redox couples limit use of such batteries to primary, non-rechargeable batteries. Consequently, considerable effort has been made to form a redox pair in which zinc can be used in a secondary, rechargeable battery.

For example, zinc may form a redox pair with nickel to provide a rechargeable redox system. While many rechargeable zinc/nickel batteries frequently exhibit a relatively good power to weight ratio, several problems of the zinc/nickel redox pair persist. Among other difficulties, such batteries tend to have a comparably poor cycle life of the zinc electrode. Moreover, nickel is known to be a carcinogen in water-soluble form, and is thus problematic in production and disposal.

To circumvent at least some of the problems with toxicity, zinc may be combined with silver oxide to form a secondary battery. Rechargeable zinc/silver batteries often have a relatively high energy and power density. Moreover, such batteries typically operate efficiently at extremely high discharge rates and generally have a relatively long dry shelf life. However, the comparably high cost of the silver electrode generally limits the use of zinc/silver batteries to applications where high energy density is a prime requisite.

In a further, relatively common secondary battery, zinc is replaced by cadmium and forms a redox couple with nickel. Such nickel/cadmium batteries are typically inexpensive to manufacture, exhibit a relatively good power to weight ratio, and require no further maintenance other than recharging. However, cadmium is a known toxic element, and thereby further increases the problems associated with health and environmental hazards.

Thus, despite the relatively widespread use of secondary batteries, numerous problems persist. Among other things, all or almost all of the known secondary batteries can only be continuously operated under conditions in which the cathode compartment is separated from the anode compartment by a separator. Loss of the separation (e.g., due to puncture of the membrane by dendrites forming during recharge) will typically result in undesired plating of one or more components of the electrolyte on the battery electrode and thereby dramatically decrease the performance of such batteries.

Although numerous secondary batteries are known in the art, all or almost all of them suffer from one or more disadvantages. Particularly, the performance of known secondary batteries will significantly decrease when anolyte and catholyte of such batteries will inadvertently mix. Therefore, there is still a need to provide improved batteries.

SUMMARY OF THE INVENTION

The present invention is directed to a battery comprising an electrolyte that contacts the anode and includes a redox pair formed by a first element and a second element, wherein the battery is charged at a voltage sufficient to plate the first element at the anode, and wherein the voltage is insufficient to plate the second element on the anode when the second element is present at the anode. Especially contemplated batteries are secondary batteries that comprise a mixed electrolyte. Especially preferred redox pairs provide an open circuit voltage of at least 2.3 Volt per cell.

In one aspect of the inventive subject matter, contemplated electrolytes are acid electrolytes, and it is particularly preferred that such electrolytes comprise an organic acid (e.g., methane sulfonic acid, trifluoromethane sulfonic acid) or inorganic acid (e.g., perchloric acid, nitric acid, hydrochloric acid, or sulfuric acid), wherein the anion of the acid forms a complex (e.g., salt) with at least one of the first and second element. In further contemplated aspects, suitable electrolytes may also be gelled.

In another aspect of the inventive subject matter, contemplated first elements particularly include zinc and/or titanium, while preferred second elements include lanthanides (e.g., cerium, praseodymium, neodymium, terbium, or dysprosium).

In a further aspect of the inventive subject matter, contemplated batteries may include a separator that separates a battery cell into an anode compartment and a cathode compartment, wherein the anode compartment comprises an anolyte that includes the first element, wherein the cathode compartment that comprises a catholyte that includes the second element, and wherein the anode compartment comprises at least 5 vol % catholyte, more preferably at least 10 vol % catholyte, and most preferably least 25 vol % catholyte.

Various objects, features, aspects, and advantages of the present invention will become more apparent from the following detailed description of preferred embodiments of the invention, along with the accompanying drawing.

DETAILED DESCRIPTION

Figure 1A:
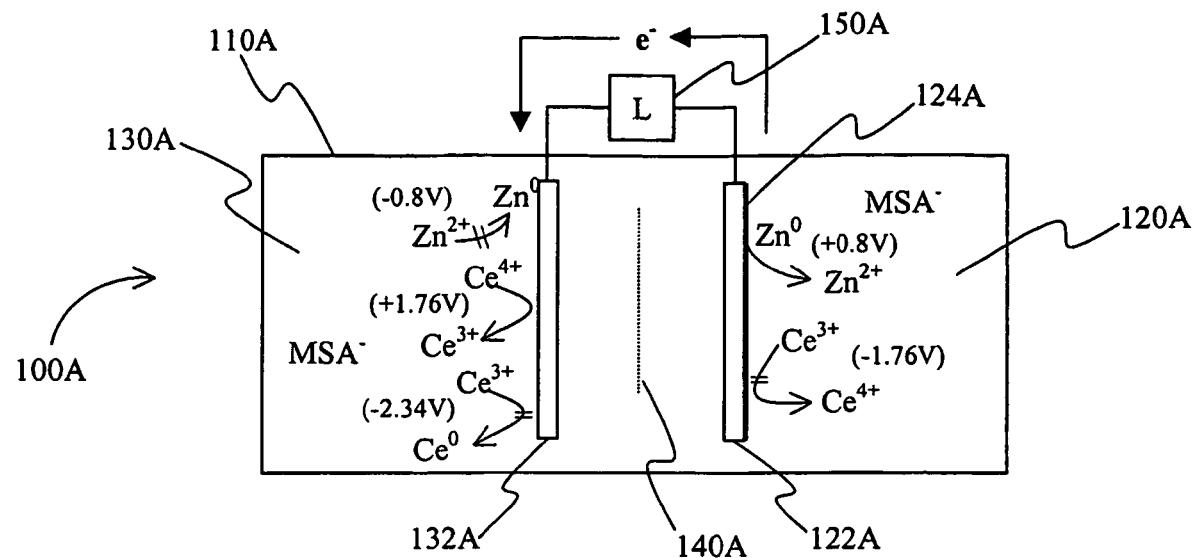
FIG. 1A is a schematic view of an exemplary battery during discharge.

The inventors have discovered that a battery may comprise an electrolyte that contacts the anode and includes a redox pair formed by a first element and a second element, wherein the battery is charged at a voltage sufficient to plate the first element at the anode, and wherein the voltage is insufficient to plate the second element on the anode when the second element is present at the anode. Thus, a secondary battery may comprising a mixed electrolyte that includes a redox pair formed by a first element and a second element.

As used herein, the term "first element" refers to a chemical element that may be in ionic form as well as in non-ionic form. For example, a preferred first element is zinc, which may be present as metallic (e.g., plated) zinc as well as ionic zinc (e.g., as $Zn^{2+}$ in a salt with an anion of an acid). Similarly, the term "second element" refers to a chemical element that may be in ionic form as well as in non-ionic form. For example, a preferred second element is cerium, which may be present in a first ionic form (e.g., $Ce^{3+}$ in a salt with an anion of an acid) as well as in a second ionic form (e.g., as $Ce^{4+}$ in a salt with an anion of an acid). Furthermore, it is generally contemplated that the first and second elements are chemically distinct, i.e., are not the same chemical element in a different oxidation state.

As also used herein, the term "redox pair" is interchangeably used with the term "redox couple" and refers to a combination of the first element (or ion of the first element) and the second element (or ion of the second element) in a battery, in which reduction of one element and oxidation of the other element produce the current provided by the battery.

As further used herein, the term "the battery is charged" refers to a process in which one element is reduced and the other element is oxidized by providing an electric current such that after charging reduction of one element and oxidation of the other element produces a current in the battery. Viewed from another perspective, the electrochemical redox reactions in the battery during discharge are reversed during charging by providing electric current to the battery.

As further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

As still further used herein, the term "plate the first element at the anode" means that the first element is reduced at the anode by a current (during charging) at a particular voltage from an ionic species to a non-ionic species. Thus, the term "plating" will refer to electrochemical deposition of the element as well as to electrochemical gas formation if the element is in gas form under standard conditions (20° C., atmospheric pressure) when in an non-ionic state.

As also used herein, the term "mixed electrolyte" refers to an electrolyte in which the first and second element are present in the same compartment (i.e., anode and/or cathode compartment) under normal operating conditions. The term "normal operating condition" as used herein refers to repeated (i.e., at least 10) charge/discharge cycles and specifically excludes operation during which a separator has been accidentally perforated (e.g., during charging).

In a particularly preferred aspect of the inventive subject matter, a battery will comprise methane sulfonic acid as acid electrolyte in which cerium and zinc form a redox couple, and in which the anion of the methane sulfonic acid will form a complex with the cerium and zinc ions. Based on previous experiments (see below), such cerium-zinc redox couples have an open circuit voltage of at least 2.3 Volt, and more typically 2.40 to 2.46 Volt, which is superior to numerous known zinc-based redox couples.

In such batteries, the inventors contemplate that plated non-ionic zinc metal will be dissolved from the anode into the electrolyte during discharge of the battery and re-plated onto the electrode during charging following the equation (I) below. On the other electrode cerium ions will donate/receive electrons following the equation (II) below.

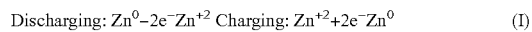

Discharging: $Zn^0 - 2e^- \; Zn^{+2}$ Charging: $Zn^{+2} + 2e^- \; Zn^0$ (I)

Discharging: $2Ce^{+4} + 2e^- \; 2Ce^{+3}$ Charging: $2Ce^{+3} - 2e^- \; 2Ce^{+4}$ (II)

It should be particularly appreciated that the cerium-zinc redox pair will have numerous advantages over other known redox pair configuration. Among other things, the inventors discovered that such cerium-zinc redox pairs (and other redox couples) may be operated in a battery, and especially in a secondary battery, without a separator or with a separator that allows at least partial mixing of the anode and cathode electrolyte.

This is illustrated in an exemplary battery during discharge as shown in FIG. 1A. Here, battery 100A includes a cell 110A that is at least partially divided by separator 140A into an anode compartment 120A and a cathode compartment 130A. Both anode and cathode compartment include methane sulfonic acid as acid electrolyte, wherein the anion of the acid ($MSA^-$) complexes the ionic forms of zinc ($2^+$) and cerium ($3^+/4^+$). The anode compartment 120A further comprises anode 122A that is at least partially covered by non-ionic plated metallic zinc ($Zn^0$). The cathode compartment 130A comprises cathode 132A. Anode 122A and cathode 132A are electrically coupled to the load 150A, and the arrow above the load indicates the flow of the electrons from the anode to the cathode during discharge.

It should be particularly appreciated that due to the standard reduction potentials (see Table 1 below) of the first and second elements, only zinc is oxidized (de-plated) on the anode, while (if present) $Ce^{3+}$ will not be oxidized to $Ce^{4+}$. Since $Zn^{2+}$ is the highest oxidation state for zinc under operating conditions in the battery, no further oxidation of $Zn^{2+}$ on the anode will take place. Similarly, on the cathode $Ce^{4+}$ will be readily reduced to $Ce^{3+}$, however, $Ce^{3+}$ will not be further reduced due to its standard reduction potential under operating conditions in the battery. Similarly, $Zn^{2+}$ will not be reduced (plated) on the cathode due to its standard reduction potential under operating conditions in the battery.

TABLE 1

Battery during Discharge

| Reaction | Anode | Cathode |
|---|---|---|
| $Zn^0 \rightarrow Zn^{2+} + 2e^-$ | +0.8 V | -/- |
| $Zn^{2+} + 2e^- \rightarrow Zn^0$ | -/- | -0.8 V |
| $Ce^{3+} \rightarrow Ce^{4+} + e^-$ | -1.76 V | -/- |
| $Ce^{4+} + e^- \rightarrow Ce^{3+}$ | -/- | +1.76 |
| $Ce^{3+} + 3e^- \rightarrow Ce^0$ | -/- | -2.34 V |

Figure 1B:
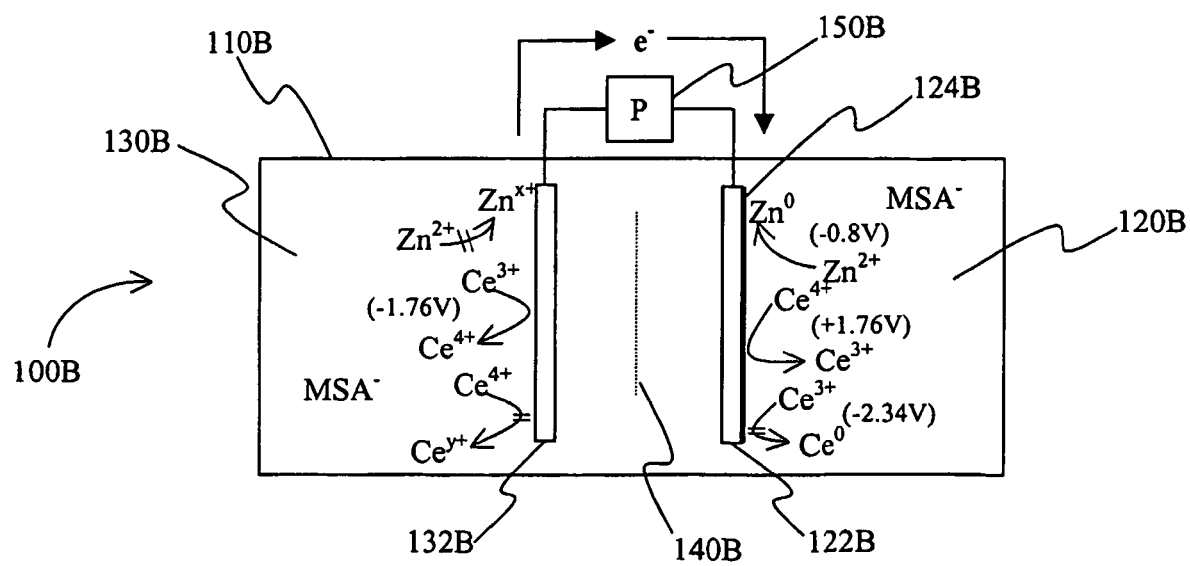
FIG. 1B is a schematic view of an exemplary battery during charge.

Similarly, FIG. 1B depicts an exemplary battery during charge. Here, the battery 100B includes a cell 110B that is at least partially divided by separator 140B into an anode compartment 120B and a cathode compartment 130B. Both anode and cathode compartments include methane sulfonic acid as acid electrolyte, wherein the anion of the acid ($MSA^-$) complexes the ionic forms of zinc ($2^+$) and cerium ($3^+/4^+$). The anode compartment 120B further comprises anode 122B that is at least partially covered by non-ionic plated metallic zinc ($Zn^0$). The cathode compartment 130B comprises cathode 132B. Anode 122B and cathode 132B are electrically coupled to the power source 150A, and the arrow above the power source indicates the flow of the electrons during charging of the battery.

Here, due to the standard reduction potentials of the first and second elements (see Table 2 below), zinc is reduced (plated) on the anode, and (if present) soluble $Ce^{4+}$ will be reduced to soluble $Ce^{3+}$. Since $Zn^0$ is the lowest reduction state for zinc under operating conditions in the battery, no further reduction of non-ionic metallic $Zn^0$ on the anode will take place. Similarly, on the cathode $Ce^{3+}$ will be readily oxidized to $Ce^{4+}$, however, $Ce^{4+}$ will not be further oxidized since $Ce^{4+}$ is the highest oxidation state for cerium under operating conditions in the battery. Similarly, $Zn^{2+}$ (if present) will not be further oxidized at the cathode due to its standard reduction potential under operating conditions in the battery.

TABLE 2

Battery during Charge

| Reaction | Anode | Cathode |
|---|---|---|
| $Zn^0 \rightarrow Zn^{2+} + 2e^-$ | -/- | -/- |
| $Zn^{2+} + 2e^- \rightarrow Zn^0$ | -0.8 V | -/- |
| $Ce^{3+} \rightarrow Ce^{4+} + e^-$ | -/- | -1.76 |
| $Ce^{4+} + e^- \rightarrow Ce^{3+}$ | +1.76 V | -/- |
| $Ce^{3+} + 3e^- \rightarrow Ce^0$ | -2.34 V | -/- |

Thus, it should be appreciated that secondary batteries having an electrolyte with contemplated redox pairs may be charged in a configuration where anolyte (i.e., electrolyte in the anode compartment) and catholyte (i.e., electrolyte in the cathode compartment) may be at least partially mixed in at least one compartment. Consequently, it is contemplated that batteries according to the inventive subject matter may or may not have a separator. Where a separator is employed, it is contemplated that the separator separates a cell into an anode compartment and a cathode compartment, wherein the anode compartment comprises an anolyte that includes the first element, and wherein the cathode compartment that comprises a catholyte that includes the second element.

In further contemplated aspects of the inventive subject matter, the separator may be configured (by design or by incidental perforation of the separator) such that the anode compartment comprises at least 5 vol % catholyte, more typically at least 10 vol % catholyte, and most typically at least 25 vol % catholyte.

In contemplated systems, and especially in preferred Zn/Ce redox systems using methane sulfonic acid as a component in the electrolyte, it should be recognized that the following reactions occur during charging (The reactions are reversed on discharge):

Cathode: 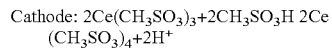

Anode: 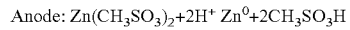

Consequently, it should be recognized that where a separator is employed, only $H^+$ ions are moving through the separator during charge and discharge. Thus, particularly contemplated separators include membranes that allow flow of hydrogen/$H^+$ ions across the membrane. There are numerous such membranes known in the art, and all of those are deemed suitable for use in conjunction with the teachings presented herein. However, a particularly preferred membrane includes a Nafion® membrane (Perfluorosulfonic acid—PTFE copolymer in the acid form; commercially available from DuPont, Fayetteville, N.C.).

With respect to the first element it is contemplated that suitable elements may include various elements other than zinc, and a particularly preferred alternative element is titanium. However, other suitable elements include lead, mercury, cadmium, and/or tin. Similarly, it is contemplated that the second element need not be limited to cerium, and numerous alternative elements are also considered suitable for use herein. Especially suitable alternative elements include lanthanides. Many lanthanides are known to exhibit similar physico-chemical and electrochemical properties among each other. Consequently, it is contemplated that the following elements may form a redox pair with zinc (or any other first element) in contemplated batteries: Lanthanum, praseodymium, neodymium, promethium, samarium, europium, gadolinium, terbium, dysprosium, holmium, erbium, thulium and/or ytterbium. Further contemplated aspects of alternative first and second elements are disclosed in the PCT patent application entitled "Lanthanide Batteries", filed on or about Robert Lewis Clarke, Brian J. Dougherty, Stephen Harrison, J. Peter Millington and Samaresh Mohanta, which was filed on or about Feb. 12, 2002, which is incorporated herein by reference.

Furthermore, it is generally contemplated that all combinations of first and second elements are deemed suitable, in which during charging the first element has a reduction potential between a first and a second reduction state (e.g., between $4^+$ and $2^+$, or between $1^+$ and 0) that is more positive than the reduction potential between a first and a second reduction state of the second element. Viewed from another perspective, it is contemplated that preferred first elements will reduced on the battery anode during charging at a charging voltage, while the second element is not reduced, and more preferably not plated (i.e., reduced to non-ionic state) at the anode at the same charging voltage. Further contemplated aspects of alternative first elements, second elements, and configurations are disclosed in the PCT patent application entitled "Cerium Batteries" filed on or about Robert Lewis Clarke, Brian J. Dougherty, Stephen Harrison, J. Peter Millington and Samaresh Mohanta, which was filed on or about Feb. 12, 2002, which is incorporated herein by reference.

In still further alternative aspects, it is contemplated that the electrolyte may also be gelled, and that preferred gelled electrolytes include one or more anions of an organic or inorganic acid. Various suitable methods and compositions for gelled electrolytes are disclosed in the PCT patent application entitled "Improved Battery With Gelled Electrolyte", filed on or about Robert Lewis Clarke, Brian J. Dougherty, Stephen Harrison, J. Peter Millington and Samaresh Mohanta, which was filed on or about Feb. 12, 2002, which is incorporated herein by reference.

With respect to the amount of cerium, it is contemplated that the cerium ion concentration may vary considerably and may generally be in the range of between one micromolar (and even less) and the maximum saturation concentration of the particular cerium ion. However, it is preferred that the cerium ion concentration in the electrolyte is at least 0.2M, more preferably at least 0.5M, and most preferably at least 0.7M. Viewed from another perspective, it is contemplated that preferred cerium ion concentrations lie within 5-95% of the solubility maximum of cerium ions in the electrolyte at a pH<7 and 20° C.

It is further contemplated that the cerium ions may be introduced into the electrolyte in various forms. However, it is preferred that cerium ions are added to the electrolyte solution in form of cerium carbonate, numerous alternative forms, including cerium hydrate, cerium acetate, or cerium sulfate are also contemplated. Similarly, the concentration of zinc ions in the electrolyte is at least 0.3M, more preferably at least 0.8M, and most preferably at least 1.2M. With respect to the particular form of zinc addition to the electrolyte, the same considerations as described above apply. Thus, contemplated zinc forms include $ZnCO_3$, ZnAcetate, $Zn(NO_3)_2$, etc.

With respect to the electrolyte, it is preferred that the electrolyte is an acid electrolyte and comprises an organic acid. Particularly preferred organic acids include those that are able to dissolve ceric ions, cerous ions and zinc ions at a relatively high concentration (e.g., greater than 0.2M, more preferably greater than 0.5M, and most preferably greater than 0.7M), and an especially suitable organic acid is methane sulfonic acid (MSA).

However, alternative organic acids also include trifluoromethane sulfonic acid ($CF_3SO_3H$), which is thought to make a better solvent anion than methane sulfonic acid for ceric ions. Still further contemplated acids include inorganic acids such as perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of ceric ions. Still further, it should be appreciated that in alternative aspects any Bronsted acid (a compound that donates a hydrogen ion ($H^+$) to another compound) may be employed as counter ion in the electrolyte.

With respect to the concentration of the MSA or other acid it should be appreciated that the concentration of MSA or other acid is not limiting to the inventive subject matter. However, a particularly preferred concentration of methane sulfonic acid is in the range of between 1M and 4M, and more preferably between 2.5M and 3.5M. In further alternative aspects of the inventive subject matter, it is contemplated that EDTA or alternative chelating agents could replace at least a portion, if not all of the methane sulfonic acid in at least the zinc cathode part of the cell.

Thus, in a further aspect of the inventive subject matter, it is contemplated that a battery will include an electrolyte in which a first element $E_1$ and a second element $E_2$ form a redox pair, and in which the redox reaction will follow equation (III).

$$E_1^x + E_2^y \rightarrow E_1^{x+n} + E_2^{y-n} \qquad \text{(III)}$$

In which $E_1^x$ is the first element having electric charge of x, $E_2^y$ is the second element having an electric charge of y, $E_1^{x+n}$ is the first element having electric charge of x increased (i.e., made more positive) by n electrons donated to the anode during discharge, and $E_2^{y-n}$ is the second element having electric charge of x decreased (i.e., made more negative) by n electrons received at the cathode during discharge, and wherein during charging:

the reaction $E_1^{x+n} + n^*e^- \rightarrow E_1^x$ has a reduction potential $E_1^0$
the reaction $E_2^y + n^*e^- \rightarrow E_2^0$ has a reduction potential $E_2^0$
the reaction $E_2^{y-n} + n^*e^- \rightarrow E_2^0$ has a reduction potential $E_2^{0\prime}$
and $E_1^0 > E_2^0 > E_2^{0\prime}$, or $E_1^0 > E_2^{0\prime} > E_2^0$ ($E_2^{0\prime}$ and $E_2^0$ is non-ionic/plated)

Consequently, all combinations of first and second elements, and particularly lanthanides as first elements and zinc or titanium as second elements are contemplated that will follow equation (III) and have the order of reduction potentials as indicated above.

In a still further contemplated aspect of the inventive subject matter, and especially where it is desirable to obtain a relatively high current efficiency of zinc plating during charging, it is preferred that Indium is added to the electrolyte to significantly increase the hydrogen overpotential. Addition of Indium is thought to act as a barrier to hydrogen evolution, thereby forcing zinc deposition upon charging of the battery. While addition of indium to alkaline electrolytes has been previously shown to reduce hydrogen the hydrogen overpotential, the inventors surprisingly discovered that zinc deposition in an acid electrolyte in the presence of indium ions was almost 95% efficient compared to 70-80% without indium (at less than 1% substitution of indium ions for zinc ions in the electrolyte).

Of course, it should be recognized that reduction of the hydrogen overpotential in contemplated batteries need not be limited to addition of indium to the electrolyte at a particular concentration, but various alternative elements (typically metals, most typically group 13 elements) at numerous other concentrations are also contemplated. For example, suitable elements include bismuth (Bi), tin (Sn), gallium (Ga), thallium (Ti), and various oxides, including diindium trioxide ($In_2O_3$), dibismuth trioxide ($Bi_2O_3$), tin oxide (SnO) and digallium trioxide ($Ga_2O_3$). With respect to the concentration of metals and other hydrogen overpotential reducing compounds, it is generally preferred that the concentration is less than 5 mol % (relative to Zn), more typically less than 2 mol % (relative to Zn), and even more typically less than 1 mol % (relative to Zn). However, and especially where such elements or other compounds exhibit a relatively high solubility, concentrations of more than 5 mol % (relative to Zn) are also considered suitable.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of cerous ions to ceric ions during charging (and the reverse reaction during discharge) is suitable for use herein. However, a particularly preferred material for a bipolar electrode is glassy carbon. The inventors surprisingly discovered that glassy carbon provides, despite operation in a highly acidic electrolyte, an excellent substrate for plating of zinc during charging. Moreover, glassy carbon is a relatively inexpensive and comparably light-weight material, thereby further improving the ratio of cost/weight to capacity. Further contemplated aspects of bipolar electrodes are disclosed in U.S. provisional patent application with the title "Electric Devices With Improved Bipolar Electrode", filed on or about Robert Lewis Clarke, Brian J. Dougherty, Stephen Harrison, J. Peter Millington and Samaresh Mohanta, which was filed on or about Feb. 12, 2002, which is incorporated by reference herein.

Similarly, while in some battery configurations a Nafion® membrane may operate more satisfactorily than other membranes, it is generally contemplated that the exact physical and/or chemical nature of the membrane is not limiting to the inventive subject matter so long as such membranes allow H+ exchange between an anode and cathode compartment in contemplated acidic electrolytes. Consequently, it should be appreciated that numerous alternative membranes other than Nafion are also suitable, and exemplary membranes include all known solid polymer electrolyte membranes, or similar materials.

It should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed.

It should still further be especially appreciated that the capacity of contemplated batteries is typically limited only by the supply of the anolyte and catholyte. Consequently, it is contemplated that a particular capacity of such batteries will predominantly be determined by a particular type of application. For example, where the application is a relatively small, non-rechargeable battery (e.g., AAA-type battery), contemplated anolyte and catholyte volumes may be between about 0.5 ml and 5 ml. In another example, where the battery is employed as an automobile starter or secondary battery, contemplated anolyte and catholyte volumes may be between about 50 ml and 3000 ml. In a further example, where the battery is a relatively large battery (e.g., load leveling batteries at power substations and commercial/industrial locations with a capacity of 100,000 kWh, and even more), contemplated anolyte and catholyte volumes may be between about 5 $m^3$ and 500 $m^3$. Various aspects of configurations and use of contemplated batteries with especially high capacity is described in pending PCT application with the title "improved load leveling battery and methods therefor", serial number PCT/US01/41678, which is incorporated by reference herein.

EXPERIMENTS

Mixed Electrolyte Batteries

Based on previous experiments with rechargeable Ce—Zn batteries, a cell was built by using two blocks of plastic Ultra High Molecular Weight Polyethylene (UHMWP), with gaskets in between each face, two electrodes, and a Nafion® membrane that separated the cell into two compartments. Electrolyte inlets were formed in the top and bottom portion of each compartment; the electrolyte was introduced into the compartment via the bottom inlet and exited the cell from the top.

The anode compartment solution contained 193 grams/liter $Ce_2(CO_3)_3 \cdot 5H_2O$, 97 g/l ZnO, 1000 g/l methanesulfonic acid (MSA) and 193 g/l of water. The cathode compartment solution contained 193 g/l $Ce_2(CO_3)_3 \cdot 5H_2O$, 65 g/l ZnO, 1000 g/l methanesulfonic acid and 190 g/l of water. The cathode compartment solution was fed to the cathode made of platinum-coated titanium mesh, and the anode compartment solution was fed to a anode made of carbon. The cell gap was 1.7 cm, flow rate about 1.7 liter per minute.

The cell was charged at 4 A (current density is 40 $mA/cm^2$) for three hours. The voltage across the cell during charging at 4 A was 3.1 to 3.2 V. The initially colorless cathode compartment solution turned yellow during charging, indicating the conversion of cerous ions ($Ce^{3+}$) to ceric ions ($Ce^{4+}$). The efficiency of this reaction was almost 100%; the zinc ions ($Zn^{2+}$) did not react with either the $Ce^{3+}$ or $Ce^{4+}$, and were not oxidized at the electrode. Zinc was deposited as a smooth, light gray deposit from the anode compartment solution. The $Ce^{3+}$ ions were not reduced at the electrode. Furthermore, very little gassing at either the negative or positive electrode was observed during the charging process. After charging the cell, the open circuit voltage maximum was 2.4 V.

The cell was discharged at a constant voltage of 1.8 V. At the cathode, the intensity of the yellow color of the electrolyte decreased, indicating that $Ce^{4+}$ was being converted to $Ce^{3+}$. No deposits were observed on the cathode, indicating that no zinc was being plated. At the anode, zinc was dissolved into the electrolyte, but the solution remained colorless, indicating that $Ce^{3+}$ was not being converted to $Ce^{4+}$. The cell was recharged/discharged for several more cycles without substantial loss of performance.

Therefore, it should be particularly appreciated that contemplated batteries may operated under conditions where inadvertent mixing of the electrolytes in the anode compartment and the cathode compartment will not substantially reduce battery, and especially electrode performance. For example, it is contemplated that the redox element in the cathode compartment will substantially not plate on the anode when (inadvertently or by design) present at the anode (i.e., less than 10%, more typically less than 5%, and most typically less than 1% of the total redox element of the cathode compartment present at the anode will plate at the anode over at least 10 charge/discharge cycles). Similarly, it is contemplated that the redox element in the anode compartment will substantially not plate on the cathode when (inadvertently or by design) present at the cathode (i.e., less than 10%, more typically less than 5%, and most typically less than 1% of the total redox element of the anode compartment present at the cathode will plate at the cathode over at least 10 charge/discharge cycles).

Thus, specific embodiments and applications of mixed electrolyte batteries have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A battery comprising:
    an electrolyte comprising a first element and a second element, wherein the first and the second element form a redox pair, and wherein the electrolyte, the first, and the second element contact an anode and wherein the first element allows charging of the battery at a voltage sufficient to plate the first element at the anode;

wherein the second element allows charging of the battery at the voltage without plating of the second element on the anode; and wherein reduction of the second element and oxidation of the first element provides a current of the battery.

2. The battery of claim 1 wherein the electrolyte is an acid electrolyte.

3. The battery of claim 2 wherein the acid electrolyte comprises an organic acid.

4. The battery of claim 3 wherein the organic acid is selected from the group consisting of methane sulfonic acid and trifluoromethane sulfonic acid.

5. The battery of claim 1 wherein the first element is zinc or titanium.

6. The battery of claim 1 wherein the second element is a lanthanide.

7. The battery of claim 6 the lanthanide is selected from the group consisting of cerium, praseodymium, neodymium, terbium, and dysprosium.

8. The battery of claim 1 wherein the first element is zinc and the second element is cerium.

9. The battery of claim 1, wherein the battery further comprises a cell with a separator that separates the cell into an anode compartment and a cathode compartment, wherein the anode compartment comprises an anolyte that includes the first element, and wherein the cathode compartment that comprises a catholyte that includes the second element.

10. The battery of claim 9 wherein the anode compartment comprises at least 5 vol % catholyte.

11. The battery of claim 9 wherein the anode compartment comprises at least 10 vol % catholyte.

12. The battery of claim 9 wherein the electrolyte further comprises indium.

13. The battery of claim 1 wherein the redox pair provides an open circuit voltage of at least 2.3 Volt per cell.

14. The battery of claim 1 wherein the electrolyte is a gelled electrolyte.

15. A secondary battery comprising a mixed electrolyte that includes a redox pair formed by a first element and a second element, and wherein reduction of the second element and oxidation of the first element provides a current of the battery.

16. The battery of claim 15 wherein the mixed electrolyte comprises an organic acid.

17. The battery of claim 16 wherein the first element comprises zinc.

18. The battery of claim 16 wherein the second element comprises a lanthanide.

19. The battery of claim 18 wherein the lanthanide comprises cerium.

20. The battery of claim 16 wherein the mixed electrolyte comprises a zinc ion and a cerium ion, and wherein the zinc and cerium ions are complexed by methane sulfonic acid anions, respectively.

* * * * *